United States Patent [19]
Carter et al.

[11] 3,974,751
[45] Aug. 17, 1976

[54] ROLLING DEVICE

[76] Inventors: Roy M. Carter, 4515 E. Garland Ave., Fresno, Calif. 93726; Troy M. Carter, 4440 N. Argyle Ave., Fresno, Calif. 93727

[22] Filed: Oct. 16, 1974

[21] Appl. No.: 515,210

[52] U.S. Cl. ............................ 93/84 R; 53/391; 56/330; 93/82
[51] Int. Cl.² .................................... A01D 51/00
[58] Field of Search ............ 214/5, 6 B, 518, 519; 56/328, 330, 370; 180/14; 280/150 R; 93/84 R, 82, 52, 49 R, 84 TW; 53/391

[56]     References Cited
         UNITED STATES PATENTS

| | | |
|---|---|---|
| 2,677,317 | 5/1954 | Vogt ................................ 93/84 R X |
| 3,059,703 | 10/1962 | Pearman ........................ 56/346 UX |
| 3,291,007 | 12/1966 | McDowell ......................... 93/52 X |
| 3,606,741 | 9/1971 | Olmo et al. ...................... 56/330 X |
| 3,702,052 | 11/1972 | Klassen .............................. 56/370 |
| 3,777,632 | 12/1973 | Pepmeier ......................... 93/82 X |

*Primary Examiner*—James F. Coan
*Attorney, Agent, or Firm*—Huebner & Worrel

[57]     ABSTRACT

A rolling device for manipulating a substantially flat work object, the device comprising a frame adapted to transmit the work object therethrough; a mechanism borne by the frame for folding the object to dispose portions thereof in overlapping relation; and a pair of powered conveyor belts mounted on the frame in object receiving relation to the mechanism and having juxtaposed runs twisted for inverting the object to dispose it in rested relation on the overlapping portions thereof.

11 Claims, 11 Drawing Figures

ROLLING DEVICE

BACKGROUND OF THE INVENTION

The present invention relates to a rolling device and more particularly to such a device which can be attached to a tractor or like vehicle so as to pick up trays of raisins from the ground, fold in opposite side edges of the trays to encapsulate the raisins, invert the folded trays and return them to the ground in inverted condition.

The manipulating of work objects in agriculture and industry involves a variety of difficulties. For example, the production of raisins involves well known and simple techniques to dry grapes harvested from their vines. Currently the most popular technique is to arrange the grapes on rectangular trays of paper measuring approximately two by three feet spread on the ground between two rows of the vines. The trays and their grapes are then left in the vineyard for preliminary sundrying. After a period of several days, the partially dried grapes are inverted by a procedure known as "turning" and the grapes again exposed to the sun for drying. After drying for the desired interval, the trays are normally rolled by manual labor into what is known as a "cigarette roll" which consists simply in lifting two opposite edges of the tray and folding them towards the center of the tray, one above the other. The entire tray is then inverted and replaced on the ground so that the weight of the folded tray and its contents holds the folded edges closed, encapsulating the raisins so as to be cured for a predetermined period while being somewhat protected from inclement weather. The dried and cured raisins are eventually taken to a packing house for separation, cleaning, stemming and packaging.

The history of the mechanization of agriculture reveals an unrelenting trend of efforts to find replacement for manual labor. In many instances, increasing labor costs where mechanization has not been achieved, has led to the abandonment of crops having high hand labor requirements. In other instances, mechanization has made continued farming of certain crops possible. Raisin production has been exceedingly difficult to mechanize. As a result, many previous raisin farmers now convert their grapes to other uses, such as fresh sales, wine or the like.

It has long been recognized that a need exists for a rolling device which, for example, can be employed to roll paper trays but such need has long resisted practical solution.

SUMMARY OF THE INVENTION

In view of the foregoing it is an object of the present invention to provide an improved rolling device which can be employed, for example, to reduce raisin production costs.

Another object is to provide a raisin tray roller capable of folding opposite edges of a tray into overlapping relation about the contents of the tray.

Another object is to provide a raisin tray roller adapted to invert a folded or rolled tray so that the folded edges are held in place by the weight of the tray and its contents.

Another object is to provide a raisin tray roller motivated from the power take-off of a tractor or like vehicle.

Another object is to provide an improved mechanism for picking up such trays and their contents.

Another object is to provide a roller for trays which is effective in picking up trays on the ground even though in disarray or inconsistently tilted.

Another object is to provide a roller for paper trays capable of rolling such trays to encapsulate their contents with a minimum of spillage or damage to the contents of the trays.

A further object is to provide a roller for trays which is fully maneuverable in vineyards and the like.

Still further objects and advantages are to provide improved elements and arrangements thereof in an apparatus for the purposes described which is dependable, economical, durable and fully effective in accomplishing its intended purposes.

DETAILED DESCRIPTION OF THE PREFERRED EMBODIMENT

Figure 1:
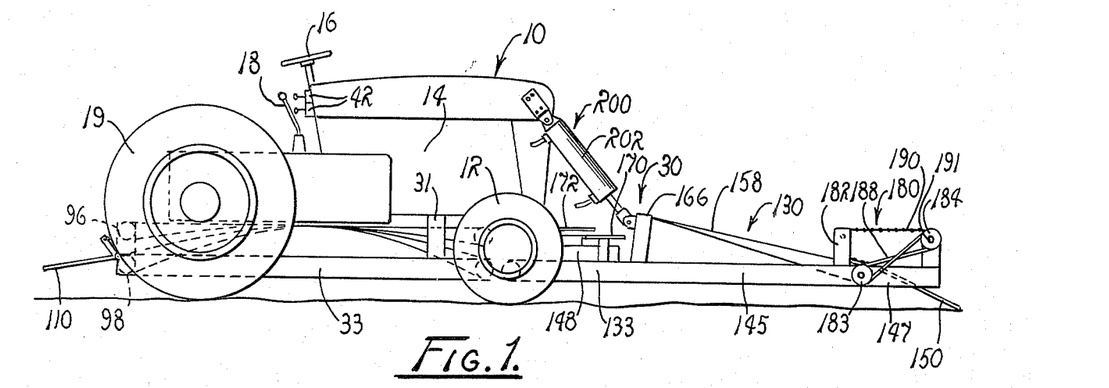
FIG. 1 is a side elevation of rolling device adapted as a roller for raisin trays embodying the principles of the present invention, shown attached to a tractor.
Figure 2:
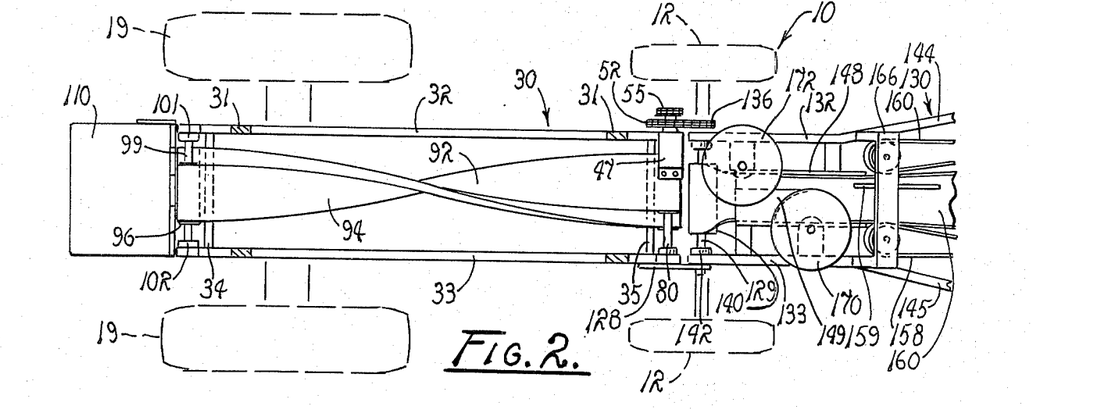
FIG. 2 is a somewhat enlarged fragmentary top plan view of the structure shown in FIG. 1.
Figure 3:
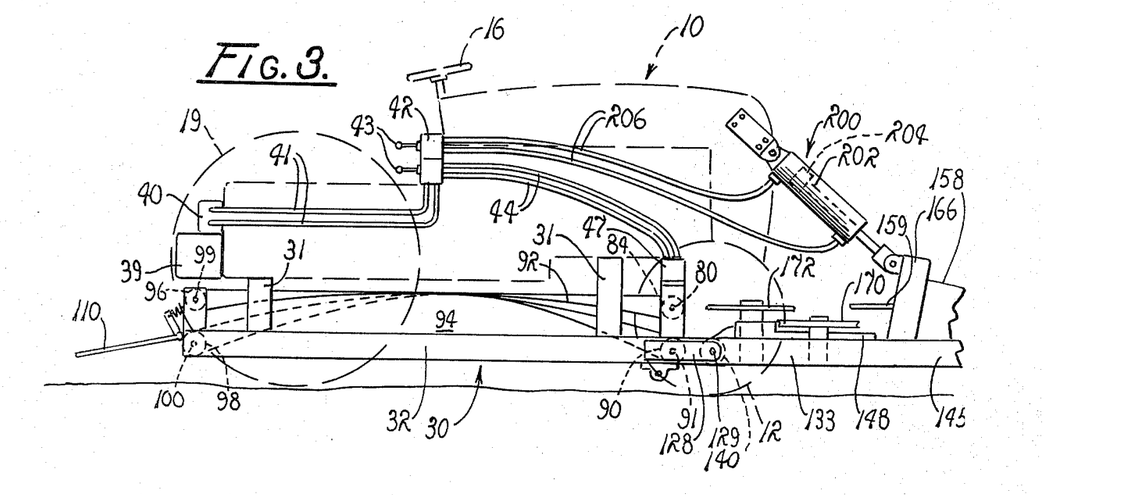
FIG. 3 is a somewhat enlarged fragmentary side elevation of the structure shown in FIG. 1 but with the tractor shown in phantom lines to reveal more of the roller and to show a hydraulic power system.

Referring more particularly to the drawings, a tractor is shown generally at 10 in FIGS. 1 through 3 having the usual front wheels 12 disposed beneath an engine housing 14. A steering wheel 16 protrudes upwardly aft of the engine housing. A gear shift lever 18 is disposed aft of the housing near the steering wheel and rear wheels 19 are mounted in supporting relation to the tractor rearwardly of the engine housing. The specified elements of the tractor are alluded to for subsequent orientation of the parts of the roller of the present invention thereto.

Figure 4:
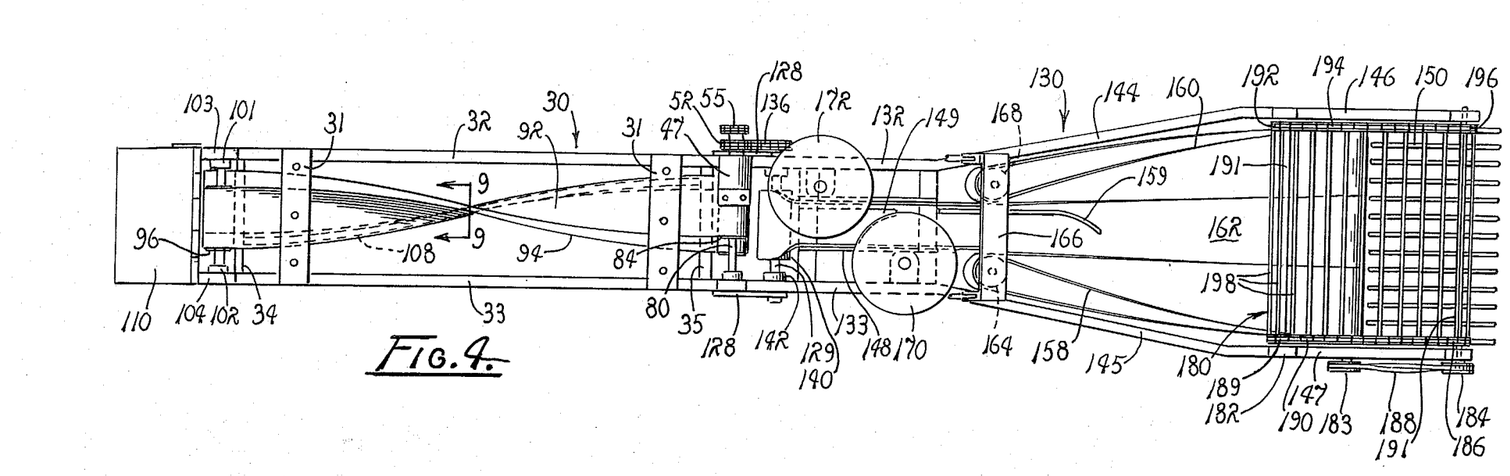
FIG. 4 is a somewhat enlarged top plan view of the roller of the present invention.
Figure 5:
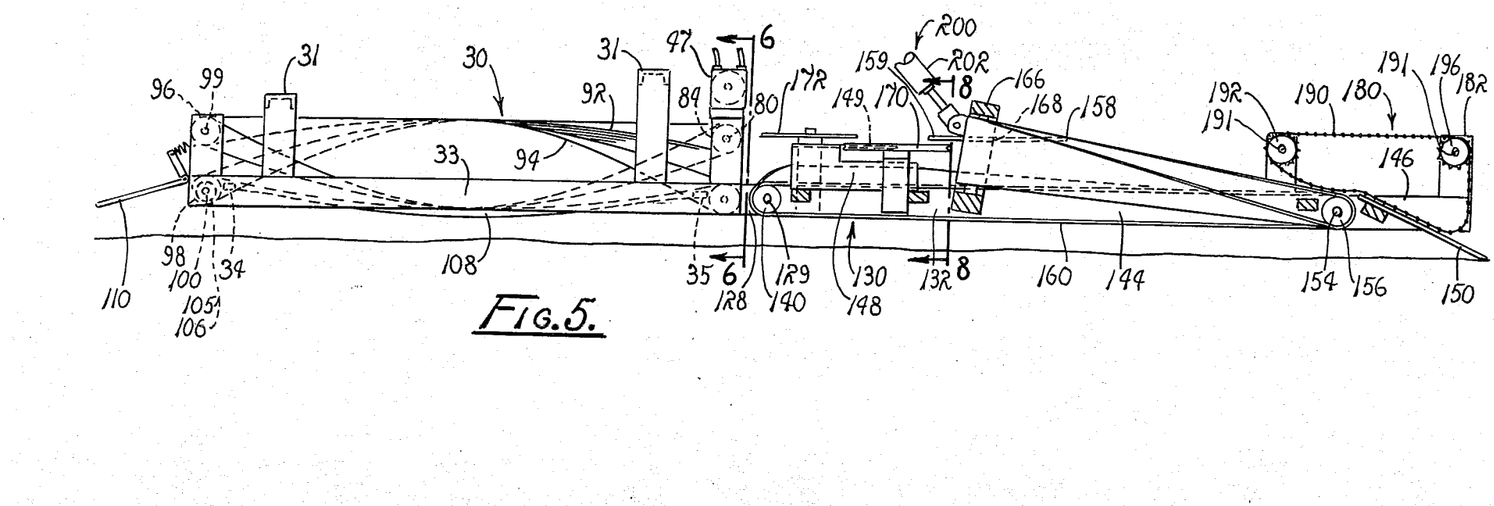
FIG. 5 is a side elevation of the roller shown in FIG. 4 with a portion thereof broken away to reveal more of the interior thereof.

A rolling device adapted for the rolling of raisin trays embodying the principles of the present invention is shown generally at 30 suspended longitudinally beneath the tractor 10 by a pair of U-supports 31, best shown in FIGS. 3 through 5 disposed between the wheels 12 and 19, said roller extending forwardly and rearwardly from the tractor. A pair of elongated frame members 32 and 33 are disposed in laterally spaced relationship longitudinally beneath the tractor, having a rear crosspiece 34 and a forward crosspiece 35, best seen in FIG. 2, connected transversely between members 32 and 33 at the rearward and forward ends thereof, respectively.

Figure 6:
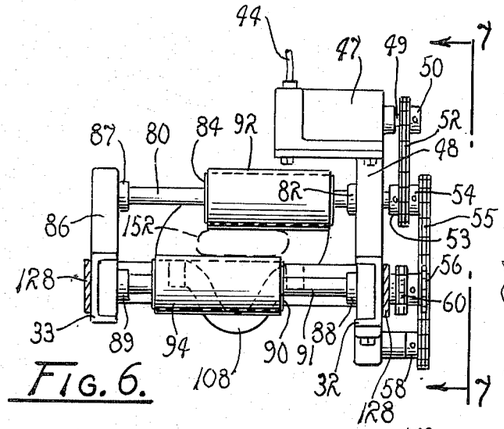
FIG. 6 is a cross section taken on line 6—6 of FIG. 5 showing portions of the drive system of the roller.

Mounted rearwardly on the tractor 10 is a hydraulic reservoir 39 having a pump 40 connected thereto and driven by a power take off of the tractor, not shown, for operation of the tray rollers 30, as will be subsequently described. As best seen in FIG. 3, a pair of hydraulic lines 41 are connected to the pump 40 and extend forwardly for connection with a hydraulic control valve 42 so as to transmit pressurized hydraulic fluid therebetween. The hydraulic valve 42 is mounted on the tractor near the steering wheel 16 convenient to a vehicle operator, not shown; and has control levers 43 mounted thereon by which the vehicle operator can control hydraulic flow. A pair of hydraulic lines 44 are connected between the valve and a hydraulic motor 47. The hydraulic motor 47, controlled by one of the control levers 43, is mounted on a vertically disposed post 48 attached to frame member 32 beneath the engine housing 14 and adjacent to a front wheel 12. As best seen in FIG. 6, the hydraulic motor has a shaft 49 on which a sprocket 50 is mounted so as to be driven by the motor. Disregarding for the moment the shafts on which the various sprockets are mounted, a chain 52 circumscribes the sprocket 50 and a driven sprocket 53 disposed beneath sprocket 50 and driven thereby. A sprocket 54 is axially and outwardly mounted on the sprocket 53 and is driven thereby. A chain 55 circumscribes the sprocket 54 and a sprocket 56 mounted below sprocket 54 and circumscribing a sprocket 58 disposed beneath and rearwardly of sprocket 56. A sprocket 60 is axially and inwardly mounted on the sprocket 56 so as to be driven thereby. Thus a power train is established consisting of motor 47, shaft 49, and sprockets 50, 53, 54, 56, 58 and 60; and chains 52 and 55.

Axially mounting the sprocket 53 is a shaft 80 extending inwardly of the sprocket and passing through a bearing 82 in the vertical post 48. The shaft 80 is axially connected through a horizontal roller 84 transversely disposed above the frame members 32 and 33 and axially offset to be adjacent to the member 32. The shaft 80 terminates at a vertical post 86 having a bearing 87 and mounted on frame member 33 laterally opposite to the post 48 on the member 32.

Bearings 88 and 89 are mounted in the frame members 32 and 33 respectively beneath the bearings 82 and 87. A roller 90 is mounted on a shaft 91 and axially extended from the sprocket 60 through the bearings 88 and 89. The roller 90 is axially offset toward the frame member 33.

Figures 10, 11:
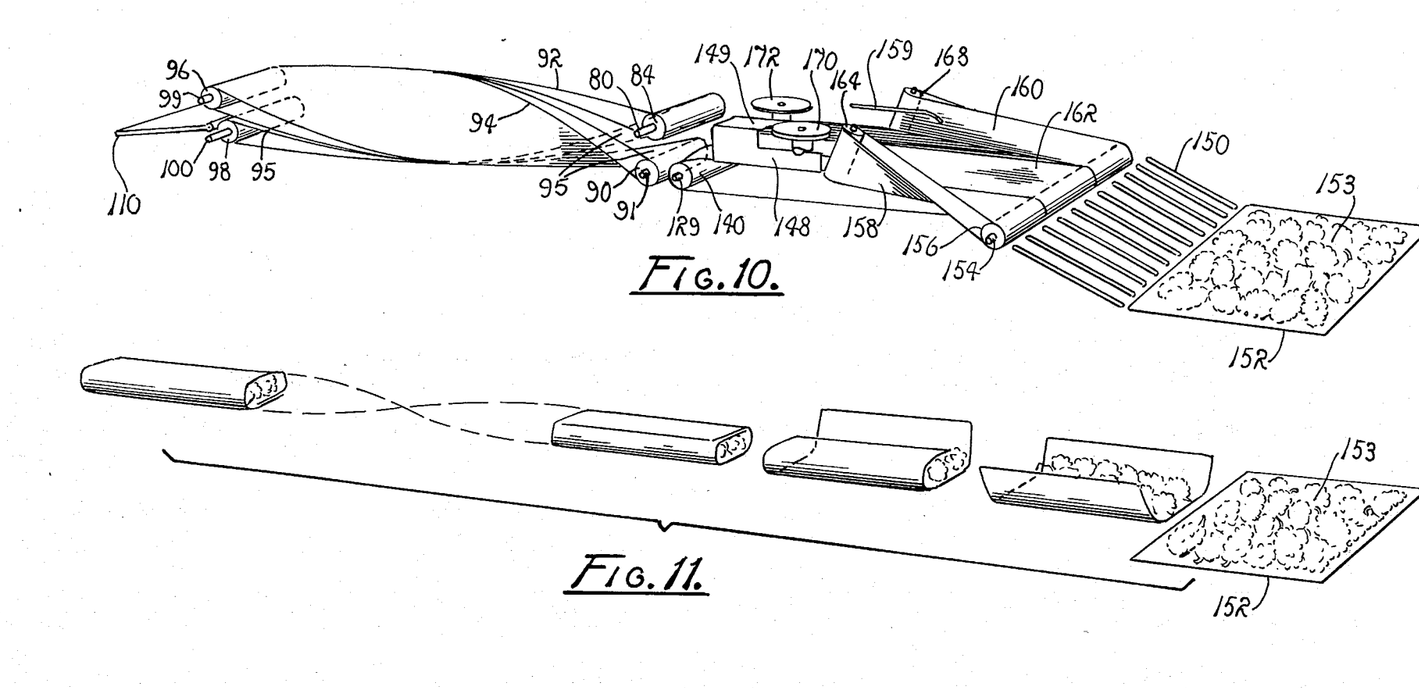
FIG. 10 is a schematic perspective view of structural elements of the roller of the present invention shown in their operative relationship but with their supporting mechanisms removed for illustrative convenience.
FIG. 11 is a perspective view of sequential stages of manipulation of a raisin tray by the roller of the present invention shown approximately adjacent to the portions of the mechanism of FIG. 10 which achieve the manipulation.

As best shown in FIGS. 4, 5 and 10, extended about rollers 84 and 90 respectively are endless belts 92 and 94, having juxtaposed interior runs 95. The belts are disposed between and somewhat above frame members 32 and 33 toward the rear crosspiece 34. The belts 94 and 92 circumscribe horizontal idler rollers 96 and 98 respectively. The rollers 96 and 98 are mounted on shafts 99 and 100 respectively in horizontal attitudes substantially parallel to the rear crosspiece 34. Shaft 99 is mounted in bearings 101 and 102 supported in the upper ends of posts 103 and 104 mounted on the frame members 32 and 33. Shaft 100 is mounted in bearings 105 and 106 supported in the frame members. The roller 96 is axially disposed above roller 98 and is offset toward frame member 32 while roller 98 is offset toward frame member 33. The belts 92 and 94, while remaining transversely substantially parallel, twist 180° about their longitudinal axes between the horizontal pair of rollers 84 and 90 and the horizontal pair of rollers 96 and 98, being substantially vertical at a point approximately midway between the two pairs of rollers. As will subsequently be described, they serve to transport rearwardly and to invert the raisin trays. A substantially horizontal rail 108, shown in FIGS. 4, 5 an 9 is mounted on the frame members 34 and 35 and disposed longitudinally beneath the belts 92 and 94 so as to prevent an object being transported therebetween from falling as the belts twist. A spring mounted, pivotal discharge ramp 110 is attached to the rear crosspiece 34 and extends rearwardly therefrom for the gravitational discharge of trays transported rearwardly thereto by the belts 92 and 94.

Figure 7:
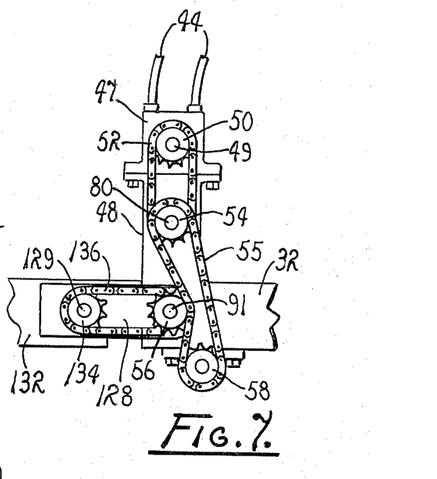
FIG. 7 is a fragmentary side elevation taken from a position indicated by line 7—7 in FIG. 6.

A pair of pivot plates 128 are individually mounted on the forward ends of the frame members 32 and 33 respectively. By means of a shaft 129, an elongated platform 130, having a pair of rearward rails 132 and 133, is pivotally mounted on the pivot plates 128, as shown best in FIG. 4. A sprocket 134 is disposed outwardly of rearward rail 132 near the rearward end thereof, shown best in FIG. 7, and is circumscribed by a chain 136 also circumscribing and being driven by the sprocket 56 disposed on frame member 32 thereby delivering power for use on the platform 130.

A roller 140 is disposed transversely between the rearward rails 132 and 133 and is driveably and axially connected to the sprocket 134 by the shaft 129 mounted in bearings 142 on said rails. The parallel rearward rails 132 and 133 are turned obliquely outwardly to form a pair of flared rails 144 and 145 extending horizontally forwardly of the rearward rails so as to form a fanshaped structure forward of the tractor 10. The flared rails have forward ends turned inwardly to form a pair of parallel forward rails 146 and 147 which extend horizontally forwardly to the flared rails and are in a spaced lateral relation greater than that of the parallel rearward rails 132 and 133. A guide frame 148 is borne on the platform 130 forwardly of roller 140 and having an overhanging guide plate 149.

Figure 8:
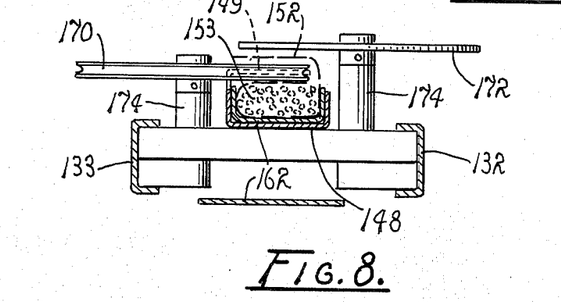
FIG. 8 is a somewhat enlarged cross section taken from a position indicated by line 8—8 in FIG. 5.
Figure 9:
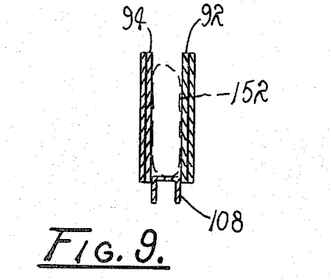
FIG. 9 is a somewhat enlarged cross section taken on line 9—9 in FIG. 4.

Attached near the forward end of the forward rails 146 and 147 is a pickup fork 150 slanting obliquely downwardly so that one end thereof contacts the ground and is adapted to pick up flat objects resting on the ground such as trays 152 and their contained raisins 153, shown in FIG. 10. A horizontal shaft 154 is connected transversely across the forward rails 146 and 147 rearwardly adjacent to the fork 150. A horizontal roller 156 is mounted on the shaft 154 and is adapted to receive objects picked up by the fork 150. Belts 158, 160 and 162 circumscribe the roller 156. The belt 158 is disposed adjacent to the forward rail 147, belt 160 is disposed adjacent to the forward rail 146 and belt 162 is disposed between belts 158 and 160 midway on the roller 156. The belt 162 extends rearwardly from the roller 156, through the guide frame 148 below its guide plate 149 circumscribing and driven by the roller 140, and is adapted rearwardly to transport objects received from fork 150. As best shown in FIGS. 8 and 10, the guide frame is preferably of a configuration adapted to fold upwardly the lateral edges of the belt 162 during passage therethrough. An arm 159 is secured on frame 166 adjacent to idler roller 168, as shown in FIG. 4.

The belt 158 extends rearwardly to a vertical idler roller 164. The roller 164 is disposed adjacent to the flared rail 145 on a substantially upright rectangular frame 166, connected between the flared rails 144 and 145 and extending upwardly therefrom. The belt 158 is turned 90° between the horizontal roller 156 and the vertical roller 164 and is adapted to turn up an edge of the raisin tray 152 introduced onto roller 156 from fork 150. The belt 160 similarly is disposed between roller 156 and a vertical idler roller 168 disposed adjacent to the flared rail 144 on the frame 166, and is adapted to turn up an edge of the raisin tray opposite to the edge turned by the belt 158. Disposed on each side of the rearward portion of the belt 162 are idler wheels 170 and 172 rotatably mounted on axial supports 174 which extend vertically from frame members 132 and 133 forwardly of the roller 140, shown in FIGS. 2, 3, 5 and 8. The wheels are disposed in substantially horizontally disposed parallel planes. The wheel 170 is forwardly of and below the wheel 172 thereby adapting the wheels for overlapping the edges of a raisin tray turned up by the belts 158 and 160 as the belt 162 conveys the tray rearwardly toward roller 140. As best shown in FIGS. 5 and 8, the wheels overlap, with respect to the path of travel therebetween, approximately two-thirds of their radii. The forward portion of the guide plate 149 is rearwardly aligned with the idler wheel 170 in substantially coplanar relation, as best shown in FIG. 4.

A draper 180 is mounted on and extends above and forward of the forward rails 146 and 147 and is disposed above the fork 150 so as to aid in moving raisin trays 152 upwardly to the roller 156. As evident in FIGS. 4 and 5, a draper frame 182 is mounted on the forward rails and extends upwardly therefrom. A pulley 183 is mounted on the shaft 154 and is disposed outwardly from rail 147. A pulley 184 is mounted forwardly on and near the top of the frame 182 and above the rail 147. A sprocket 186 is axially connected to the pulley 184 and is inwardly adjacent thereto. A belt 188 circumscribes the pulleys 183 and 184 so as to drive the latter oppositely from the former. A sprocket 189 is mounted rearwardly on and near the top of the draper frame above the rail 147. A draper chain 190 circumscribes the sprockets 186 and 189, being adapted to brush rearwardly across the fork 150 and thereby aid in sliding trays 152 from the ground onto the belts 158, 160 and 162. A pair of shafts 191 are individually connected to the sprockets 189 and 196 and pulleys 183 and 184 respectively and extend transversely above the rails 146 and 147 and are individually connected to sprockets 192 and 196 respectively on the opposite side of the draper frame.

A second draper chain 194 circumscribes the sprocket 192 and a sprocket 196 mounted on the draper frame 182 above the rail 146 which is disposed oppositely across the draper 180 from sprocket 186. The chain 194 has the same function as the chain 190 but is disposed on the opposite side of the draper. A plurality of slats 198 are connected between the chains 190 and 194 transversely across the draper 180 being adapted gently to contact raisin trays on the fork 150 and propel the trays and their contents upwardly and onto the conveyor belt 162.

Pivotally connected between the forward portions of the tractor engine housing 14 and the rectangular frame 166 are a pair of hydraulic rams 200 having cylinders 202 and pistons 204 adapted to pivot the platform 130 upwardly and downwardly. A pair of hydraulic lines 206 interconnect each cylinder 202 and the valve 42 providing elevational control of the fork 150 and draper 180 by one of the levers 43 mounted on the valve.

OPERATION

The operation of the described embodiment of the present invention is believed to be clearly apparent and is briefly summarized at this point. The rolling device 30 of the present invention is attached to a conventional tractor 10 by any convenient means as by bolting U-supports 31 to the tractor frame, suspending the tray roller 30 therefrom, mounting the valve 42 near a tractor operator, and connecting the hydraulic rams 200 to the engine housing 14. If the tractor with the attached tray roller must first be driven to the row of raisin trays 152 to be rolled, the operator manipulates the proper control lever 43 so as to pivot the pivoting platform 130 upward by means of rams 200 and thereby reduce the effective length of the tray roller and render it more maneuverable.

As a preliminary to the use of the rolling device of the present invention, grapes have been picked from the vines and laid on paper trays 152 arranged in a substantially straight line between rows of vines with two edges of the trays parallel with the rows and with two other edges orthogonal thereto. The grapes are disposed in the sun for drying and curing to form raisins 153.

The tractor 10 is positioned longitudinally between two rows of vines, and the pivoting platform 130 is lowered into a substantially horizontal position. The operator actuates the hydraulic system by manipulation of the control levers 44 so that the belts 52, 54, 158, 160 and 162 are turned about their respective rollers and the draper chains 190 and 194 are driven by the belt 188 and the associated sprockets. The lower runs of the draper chains 190 and 194 travel rearwardly and upwardly of the fork 150 at the same speed as the forward velocity of the tractor 10 carrying the slats 198 rearwardly with them so as to remain substantially stationary with respect to the ground. The belts 158, 160 and 162 travel rearwardly at the same speed as the slats. The belts 92 and 94 have adjacent runs which travel rearwardly at the same rate. The operator guides the tractor forwardly until the fork 150 is almost even with the nearest tray edge which is orthogonal to the vine rows. The rams 200 are adjusted further so as to position the fork beneath the tray while the tractor is being propelled forwardly. The forward motion of the tractor pushes the fork 150 beneath the tray 152 causing the tray and its contents 153 to slide upwardly on the fork until the slats 198 between the draper chains 190 and 194 rest on the tray and its contents thereby urging them upwardly on the fork toward the roller 156. The chains contact only the edges of the tray, while the transverse slats extend fully across the tray, lightly resting on the tray as well as the raisins. As the tray is brought across the roller 156, the motion of the belts 158, 160 and 162 act to transport the tray rearwardly. The edges of the tray adjacent to the flared rails 144 and 145 rest on the outer belts 158 and 160, which are rotated between the horizontal roller 156 and the vertical rollers 164 and 168 respectively. The disposition of the outer belts serves to fold upwardly the edges of the tray resting thereon forming the tray into a U-shaped channel structure with the raisins contained in the center thereof. As best seen in FIG. 4, the edge of the tray adjacent to belt 160 is directed between that belt and arm 159 so as to retain that portion of the tray in upstanding relation during passage therebetween.

The conveyor belt 162 continues to urge the folded raisin tray rearwardly to engage the idler wheels 170 and 172 and pass through the guide frame 148. Wheel 170, adjacent the rail 133, first contacts the tray by flattening inwardly the edge folded upwardly by belt 158. The wheel 172, disposed rearwardly of wheel 170, engages the opposite vertically folded edge of the tray after it is conveyed by belt 162 rearwardly of arm 159 thus overlapping the edge previously flattened by wheel 170, shown in FIGS. 8 and 11. Consequently as the tray reaches the roller 140 it is in a "cigarette roll" familiar in raisin processing and consisting of two opposite edges of the tray successively positioned inwardly over the raisins.

The function of the belts 92 and 94 is to invert the "rolled" tray 152 so that the overlapping edges are beneath the raisins contained within the tray. The tray is introduced between the belts 92 and 94 by the combined action of rollers 140, 90 and 84. As the adjacent runs 95 of the belt travel rearwardly with the tray and its contents 153 disposed therebetween, the inversion of the tray is accomplished by the twisting action of the belts. The rail 108 serves as a slide supporting the tray and its contents when the belts are transversely vertical. The tray is thus inverted as the belts enclosing the trays are inverted with respect to each other.

After inversion, the tray 152 is ready to be replaced on the ground. This is accomplished by the ejection of the tray through the rollers 96 and 98 and onto the discharge ramp 110 so that the tray slides therefrom onto the ground with the overlapped edges disposed beneath the raisins 153.

The rolling device of the present invention thus automatically rolls opposite edges of a raisin tray, requiring attention of the operator only during initial positioning of the pickup fork 150 beneath the tray. The tray also is replaced on the ground for curing of the raisins with the folded edges secured underneath by the weight of the raisins 153, awaiting removal after the desired curing interval.

Although the invention has been herein shown and described in what is conceived to be the most practical and preferred embodiment, it is recognized that departures may be made therefrom within the scope of the invention, which is not to be limited to the illustrative details disclosed.

Having described our invention, what we claim as new and desire to secure by Letters Patent is:

1. A device for manipulating a substantially flat work object, the device comprising a frame adapted to transmit the work object therethrough; means borne by the frame for folding said object to dispose portions thereof in overlapping relation; and a pair of powered conveyor belts mounted on the frame in object receiving relation to the folding means and having juxtaposed runs twisted for inverting said object to dispose it in rested relation on the overlapping portions thereof.

2. A rolling device for manipulating a substantially flat work object into a roll comprising a frame defining a series of work stations; means mounted in the frame including a conveyor belt disposed on rollers spaced successively along the frame for transmitting the work object successively through the work stations in a predetermined direction of travel; means mounted in one of said work stations including a pair of belts each of which is disposed between two rollers having orthogonal axes for folding the work objects during transmission of the work object therethrough to form a pair of upwardly extending edges; means mounted in a succeeding work station including a pair of idler wheels disposed on opposite sides of the conveyor belt mounted so as to rotate around substantially vertical axes for folding said edges over the work object in overlapping relation; and means mounted in a succeeding work station including a pair of belts mounted on axially horizontal rollers disposed so as to invert a work object between said belts to maintain the object in covering relation to the overlapping edges thereof.

3. A device for handling a substantially flat work object, having opposite side portions, comprising a frame having a series or work stations; means borne by the frame for transmitting a work object successively through the work stations in a predetermined direction of travel; belt means mounted on the frame in the first of said work stations with respect to the direction of travel for engaging said opposite side portions of the work object and bending said portions into substantially parallel attitudes substantially normal to the work object; means fastened on the frame in the next succeeding work station for folding said portions toward each other in overlapping relation; and means mounted on the frame in the next succeeding work station for inverting the work object to entrap the overlapping portions.

4. The device of claim 3 wherein the belt means includes a pair of belts mounted on opposite sides of the transmitting means and extending in rearwardly movable runs from forward positions substantially coplanar with the transmitting means to rearward positions substantially right angularly related to the transmitting means.

5. The device of claim 4 wherein the folding means includes a pair of peripherally overlapping wheels borne by the frame for rotation about axes substantially normal to the transmitting means and individually engagable with said portions to fold them into said overlapping relation.

6. The device of claim 3 wherein the inverting means includes a pair of conveyor belts mounted on the frame and having juxtaposed runs extending from work object receiving ends disposed in receiving relation to the folding means and movable therefrom to discharge ends twisted substantially 180° from said receiving ends.

7. A rolling device adapted to form a work object, having a flat surface, into a roll, the device comprising a supporting frame; conveying means mounted on the frame for propelling the work object between predetermined first and second points; folding means disposed on the frame adjacent to the first point adapted to receive the flat surface of the work object and impart folds therein so as to form a pair of upwardly extending portions defining a trough; overlapping means disposed between the folding means and the second point and having a pair of peripherally overlapping idler wheels mounted to rotate around substantially vertical axes with the wheels disposed on opposite sides of the conveying means, said overlapping means being adapted to superimpose one said upwardly extending portion over the other; and rotating means mounted on the frame adjacent the second point adapted to invert the work object.

8. A rolling device adapted to form a work object, having a substantially flat surface, into a roll, the device comprising a supporting frame; conveying means mounted on the frame for propelling the work object between predetermined first and second points; folding means disposed on the frame adjacent to the first point adapted to receive the flat surface of the work object and impart folds therein so as to form a pair of upwardly extending portions defining a trough; overlapping means connected between the folding means and the second point adapted to superimpose one said upwardly extending portion over the other; and rotating means mounted on the frame adjacent the second point and having two belts mounted on axially horizontal rollers disposed to receive a work object at said second point and to invert said work object.

9. A rolling device adapted to form a work object, having a substantially flat surface, into a roll, the device comprising a supporting frame; conveying means mounted on the frame for propelling the work object between predetermined first and second points; folding means, having two belts each disposed between a pair of rollers having substantially orthogonal axes and said belts being disposed on opposite sides of the conveying means, disposed on the frame adjacent to the first point adapted to receive the flat surface of the work object and impart folds therein so as to form a pair of upwardly extending portions defining a trough; overlapping means connected between the folding means and the second point adapted to superimpose one said upwardly extended portion over the other; and rotating means mounted on the frame adjacent the second point adapted to invert the work object.

10. A rolling device for manipulating a substantially flat work object, the device comprising a frame adapted to transmit the work object therethrough; folding means borne by the frame including means for shaping two opposite edge portions of said work object upwardly and means for overlapping said shaped edge portions so as to form a roll, the overlapping means having two peripherally overlapping idler wheels mounted to rotate about vertical axes and adapted individually to engage an upwardly turned edge portion; and means mounted on the frame in object receiving relation to the folding means for inverting and disposing said object in rested relation on the overlapping edge portions thereof.

11. A rolling device for manipulating a substantially flat work object, the device comprising a frame adapted to transmit the work object therethrough; folding means borne by the frame including shaping means having a pair of belts disposed on opposite sides of said work object and a pair of rollers individual to each belt mounting their respective belts for travel thereabout with the rollers of each pair having axes orthogonally related to shape two opposite edge portions of said work object upwardly and the folding means also has means for overlapping the edge portions so as to form a roll; and means mounted on the frame in object receiving relation to the folding means for inverting and disposing said object in rested relation on the overlapping edge portions thereof.

* * * * *

UNITED STATES PATENT AND TRADEMARK OFFICE
CERTIFICATE OF CORRECTION

PATENT NO. : 3,974,751
DATED : August 17, 1976
INVENTOR(S) : Roy M. Carter and Troy M. Carter It is certified that error appears in the above-identified patent and that said Letters Patent are hereby corrected as shown below:

Column 1, line 20, between "left" and "in" insert ---on the ground---.

Column 3, line 52, between "91" and "axially" delete "and".

Column 4, line 42, delete "to" after "forwardly" and substitute ---of---.

Signed and Sealed this

Twelfth Day of October 1976

[SEAL]

Attest:

RUTH C. MASON
*Attesting Officer*

C. MARSHALL DANN
*Commissioner of Patents and Trademarks*